(12) United States Patent
Tuboguchi et al.

(10) Patent No.: US 11,640,432 B2
(45) Date of Patent: May 2, 2023

(54) DOCUMENT RETRIEVAL APPARATUS AND DOCUMENT RETRIEVAL METHOD

(71) Applicant: FANUC CORPORATION, Yamanashi (JP)

(72) Inventors: Yuji Tuboguchi, Yamanashi (JP); Masao Kamiguchi, Yamanashi (JP); Noriaki Neko, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 254 days.

(21) Appl. No.: 16/894,079

(22) Filed: Jun. 5, 2020

(65) Prior Publication Data

US 2020/0394229 A1 Dec. 17, 2020

(30) Foreign Application Priority Data

Jun. 11, 2019 (JP) .............................. JP2019-108684

(51) Int. Cl.
*G06F 16/00* (2019.01)
*G06F 16/903* (2019.01)
(Continued)

(52) U.S. Cl.
CPC .... *G06F 16/90344* (2019.01); *G06F 16/9038* (2019.01); *G06F 16/90332* (2019.01); *G06F 16/93* (2019.01); *G06F 40/242* (2020.01)

(58) Field of Classification Search
CPC ................. G06F 16/93; G06F 16/9038; G06F 16/90332; G06F 16/90344
(Continued)

(56) References Cited

U.S. PATENT DOCUMENTS 5,168,533 A * 12/1992 Kato ..................... G06V 30/262
                                                              382/229
5,675,819 A * 10/1997 Schuetze ............... G06F 16/334
                                                              715/205
(Continued)

FOREIGN PATENT DOCUMENTS

JP         6-309362      11/1994
JP         2002-358312   12/2002
(Continued)

*Primary Examiner* — Mariela Reyes
*Assistant Examiner* — Rezwanul Mahmood
(74) *Attorney, Agent, or Firm* — Wenderoth, Lind & Ponack, L.L.P.

(57) ABSTRACT

A document retrieval apparatus includes: a storage unit that stores documents and dictionaries applied to a model, a correspondence between a model and documents applied to the model, and a correspondence between a document and dictionaries applied to the dictionary; a model selecting unit that selects a model; a search target document specifying unit that specifies documents applied to the model selected by the model selecting unit as search target documents; a dictionary specifying unit that specifies dictionaries applied to the search target document; a query receiving unit that inputs a query; a search keyword extraction unit that extracts a search keyword group by applying the dictionary specified by the dictionary specifying unit to the query; a retrieving unit that retrieves the search target document using the search keyword group; and a retrieval result presenting unit that displays search results retrieved by the retrieving unit.

8 Claims, 13 Drawing Sheets

(51) Int. Cl.
*G06F 16/9032* (2019.01)
*G06F 16/93* (2019.01)
*G06F 40/242* (2020.01)
*G06F 16/9038* (2019.01)

(58) Field of Classification Search
USPC .......................................................... 707/706
See application file for complete search history.

(56) References Cited

U.S. PATENT DOCUMENTS

| | | | | |
|---|---|---|---|---|
| 5,907,841 | A * | 5/1999 | Sumita | G06F 16/345 |
| | | | | 707/999.005 |
| 6,154,737 | A * | 11/2000 | Inaba | G06F 16/3347 |
| | | | | 707/999.005 |
| 6,678,692 | B1 * | 1/2004 | Hyatt | G06F 16/355 |
| | | | | 715/260 |
| 8,442,844 | B1 * | 5/2013 | Trandal | G06Q 30/012 |
| | | | | 705/35 |
| 8,468,244 | B2 * | 6/2013 | Redlich | G06Q 50/18 |
| | | | | 715/255 |
| 9,573,807 | B1 * | 2/2017 | Kaufman | G06Q 10/087 |
| 10,395,772 | B1 * | 8/2019 | Lucas | G06V 30/416 |
| 10,430,650 | B2 * | 10/2019 | Namiki | G06N 3/08 |
| 10,599,767 | B1 * | 3/2020 | Mattera | G06F 40/268 |
| 10,803,399 | B1 * | 10/2020 | Cohen | G06F 16/93 |
| 10,884,712 | B1 * | 1/2021 | Koh | G06F 13/102 |
| 11,010,284 | B1 * | 5/2021 | Santiago | G06N 20/00 |
| 11,157,648 | B1 * | 10/2021 | Amico | G06F 21/6254 |
| 2001/0002466 | A1 * | 5/2001 | Krasle | G06F 3/16 |
| | | | | 704/270.1 |
| 2001/0042083 | A1 * | 11/2001 | Saito | G06V 30/40 |
| | | | | 707/E17.058 |
| 2002/0099792 | A1 * | 7/2002 | Brandin | H04L 69/329 |
| | | | | 707/E17.037 |
| 2002/0107853 | A1 * | 8/2002 | Hofmann | G06F 16/335 |
| 2002/0178155 | A1 * | 11/2002 | Sakurai | G06F 16/313 |
| 2003/0023584 | A1 * | 1/2003 | Brandin | G06F 16/258 |
| | | | | 707/E17.118 |
| 2003/0084027 | A1 * | 5/2003 | Brandin | G06F 21/6227 |
| 2003/0125929 | A1 * | 7/2003 | Bergstraesser | G06F 40/289 |
| | | | | 707/E17.071 |
| 2004/0030692 | A1 * | 2/2004 | Leitermann | G06F 16/338 |
| 2005/0086205 | A1 * | 4/2005 | Franciosa | G06F 16/3334 |
| 2005/0154690 | A1 * | 7/2005 | Nitta | G06F 16/30 |
| | | | | 707/E17.058 |
| 2005/0289182 | A1 * | 12/2005 | Pandian | G06Q 10/10 |
| 2006/0020576 | A1 * | 1/2006 | Karube | G06F 16/3322 |
| 2006/0197764 | A1 * | 9/2006 | Yang | G06T 13/80 |
| | | | | 345/473 |
| 2007/0136264 | A1 * | 6/2007 | Tran | G06F 16/9535 |
| 2008/0016065 | A1 * | 1/2008 | Takaai | G06F 16/93 |
| 2008/0181505 | A1 * | 7/2008 | Wu | G06F 16/5846 |
| | | | | 382/190 |
| 2008/0243842 | A1 * | 10/2008 | Liang | G06F 16/93 |
| 2008/0263023 | A1 * | 10/2008 | Vailaya | G06F 16/334 |
| | | | | 707/999.005 |
| 2008/0263032 | A1 * | 10/2008 | Vailaya | G06F 16/334 |
| 2008/0263033 | A1 * | 10/2008 | Vailaya | G06F 16/334 |
| 2009/0028445 | A1 * | 1/2009 | Wu | G06F 16/5846 |
| | | | | 382/225 |
| 2009/0028446 | A1 * | 1/2009 | Wu | G06V 30/268 |
| | | | | 382/229 |
| 2009/0030882 | A1 * | 1/2009 | Wu | G06F 16/5846 |
| 2010/0228693 | A1 * | 9/2010 | Dawson | G06F 40/30 |
| | | | | 707/769 |
| 2011/0060712 | A1 * | 3/2011 | Harashima | G06F 16/3344 |
| | | | | 707/E17.014 |
| 2011/0137921 | A1 * | 6/2011 | Inagaki | G06F 16/3347 |
| | | | | 707/E17.061 |
| 2011/0222109 | A1 * | 9/2011 | Yamagishi | G06F 21/64 |
| | | | | 358/1.15 |
| 2011/0270820 | A1 * | 11/2011 | Agarwal | G06F 16/31 |
| | | | | 707/E17.108 |
| 2012/0117082 | A1 * | 5/2012 | Koperda | G06F 16/24578 |
| | | | | 707/E17.084 |
| 2015/0039985 | A1 * | 2/2015 | Hara | G06F 40/177 |
| | | | | 715/212 |
| 2015/0081715 | A1 * | 3/2015 | Okura | G06F 16/313 |
| | | | | 707/739 |
| 2015/0100308 | A1 * | 4/2015 | Bedrax-Weiss | G06F 40/242 |
| | | | | 704/10 |
| 2015/0227505 | A1 * | 8/2015 | Morimoto | G06F 40/30 |
| | | | | 704/9 |
| 2016/0185044 | A1 * | 6/2016 | Leonard | G05B 15/02 |
| | | | | 700/98 |
| 2016/0196342 | A1 * | 7/2016 | Kim | G06F 40/247 |
| | | | | 707/728 |
| 2017/0308524 | A1 * | 10/2017 | Bhatt | G06F 16/285 |
| 2018/0060302 | A1 * | 3/2018 | Liang | G06F 16/35 |
| 2018/0173698 | A1 * | 6/2018 | Dubey | G06F 16/3347 |
| 2018/0300315 | A1 * | 10/2018 | Leal | G06F 16/355 |
| 2019/0018749 | A1 * | 1/2019 | Machida | G06F 16/2425 |
| 2019/0034546 | A1 * | 1/2019 | Li | G06F 16/24578 |
| 2019/0095484 | A1 * | 3/2019 | Ogawa | G06F 16/248 |
| 2019/0227693 | A1 * | 7/2019 | Liao | G06F 3/012 |
| 2019/0258727 | A1 * | 8/2019 | Schmotzer | G06F 40/242 |
| 2019/0354545 | A1 * | 11/2019 | Kamiguchi | G06F 40/242 |
| 2020/0175416 | A1 * | 6/2020 | Zhao | G06N 20/00 |
| 2020/0278971 | A1 * | 9/2020 | Tuboguchi | G06F 16/248 |
| 2020/0364233 | A1 * | 11/2020 | Chan | G06F 16/93 |
| 2020/0394229 | A1 * | 12/2020 | Tuboguchi | G06F 16/90344 |
| 2020/0394257 | A1 * | 12/2020 | Santoso | G06F 16/90324 |
| 2021/0026864 | A1 * | 1/2021 | Kamiguchi | H04L 67/34 |
| 2022/0171935 | A1 * | 6/2022 | Goyal | G06N 5/022 |
| 2022/0172039 | A1 * | 6/2022 | Liu | G06N 3/0445 |
| 2022/0207070 | A1 * | 6/2022 | Higashi | G06F 40/279 |

FOREIGN PATENT DOCUMENTS

| | | |
|---|---|---|
| JP | 2018-5833 | 1/2018 |
| JP | 2018-190366 | 11/2018 |

\* cited by examiner

FIG. 2

| MODEL | MANUAL 1 | MANUAL 2 | MANUAL 3 | MANUAL 4 |
|---|---|---|---|---|
| MODEL A | MANUAL OF MACHINE 1 (FOR EXAMPLE, INSTRUCTION MANUAL) | MANUAL OF MACHINE 2 (FOR EXAMPLE, MAINTENANCE MANUAL) | MANUAL OF ATTACHED EQUIPMENT 1 (FOR EXAMPLE, INSTRUCTION MANUAL) | MANUAL OF ATTACHED EQUIPMENT 2 (FOR EXAMPLE, MAINTENANCE MANUAL) |
| MODEL B | MANUAL OF MACHINE 3 | MANUAL OF MACHINE 4 | MANUAL OF ATTACHED EQUIPMENT 3 | MANUAL OF ATTACHED EQUIPMENT 4 |
| MODEL C | MANUAL OF MACHINE 5 | MANUAL OF MACHINE 2 (COMMON TO MODEL A) | MANUAL OF ATTACHED EQUIPMENT 5 | MANUAL OF ATTACHED EQUIPMENT 6 |
| ... | ... | ... | ... | ... |

FIG. 3A

| MANUAL | DICTIONARY |
|---|---|
| MANUAL OF MACHINE 1 | DICTIONARY 1 |
| MANUAL OF MACHINE 2 | DICTIONARY 2 |
| MANUAL OF MACHINE 3 | DICTIONARY 3 |
| MANUAL OF MACHINE 4 | DICTIONARY 4 |
| MANUAL OF MACHINE 5 | DICTIONARY 5 |
| .... | .... |
| MANUAL OF ATTACHED EQUIPMENT 1 | DICTIONARY 11 |
| MANUAL OF ATTACHED EQUIPMENT 2 | DICTIONARY 12 |
| MANUAL OF ATTACHED EQUIPMENT 3 | DICTIONARY 13 |
| MANUAL OF ATTACHED EQUIPMENT 4 | DICTIONARY 14 |
| MANUAL OF ATTACHED EQUIPMENT 5 | DICTIONARY 15 |
| MANUAL OF ATTACHED EQUIPMENT 6 | DICTIONARY 16 |
| .... | .... |

FIG. 3B

| MANUAL | COMMON DICTIONARY | INDIVIDUAL DICTIONARY |
|---|---|---|
| MANUAL OF MACHINE 1 | COMMON DICTIONARY | INDIVIDUAL DICTIONARY 1 |
| MANUAL OF MACHINE 2 | COMMON DICTIONARY | INDIVIDUAL DICTIONARY 2 |
| MANUAL OF MACHINE 3 | COMMON DICTIONARY | INDIVIDUAL DICTIONARY 3 |
| MANUAL OF MACHINE 4 | COMMON DICTIONARY | INDIVIDUAL DICTIONARY 4 |
| MANUAL OF MACHINE 5 | COMMON DICTIONARY | INDIVIDUAL DICTIONARY 5 |
| .... | .... | .... |
| MANUAL OF ATTACHED EQUIPMENT 1 | COMMON DICTIONARY | INDIVIDUAL DICTIONARY 11 |
| MANUAL OF ATTACHED EQUIPMENT 2 | COMMON DICTIONARY | INDIVIDUAL DICTIONARY 12 |
| MANUAL OF ATTACHED EQUIPMENT 3 | COMMON DICTIONARY | INDIVIDUAL DICTIONARY 13 |
| MANUAL OF ATTACHED EQUIPMENT 4 | COMMON DICTIONARY | INDIVIDUAL DICTIONARY 14 |
| MANUAL OF ATTACHED EQUIPMENT 5 | COMMON DICTIONARY | INDIVIDUAL DICTIONARY 15 |
| MANUAL OF ATTACHED EQUIPMENT 6 | COMMON DICTIONARY | INDIVIDUAL DICTIONARY 16 |
| .... | .... | .... |

FIG. 4

| SEARCH SCREEN | |
|---|---|
| LIST OF MODELS<br>MODELS A<br>　MANUAL OF MACHINE 1<br>　MANUAL OF MACHINE 2<br>　MANUAL OF ATTACHED EQUIPMENT 1<br>　MANUAL OF ATTACHED EQUIPMENT 2<br>MODELS B<br>　....<br>MODELS C<br>　.... | PLEASE SELECT MODEL FROM LIST OF MODELS.<br>PLEASE ENTER A QUERY AND PRESS THE SEARCH BUTTON.<br>MODELS : MODELS A<br>QUERY: I WANT TO KNOW OPERATION PROCEDURE OF ATTACHED EQUIPMENT<br><br>[SEARCH] |

FIG. 7

SEARCH SCREEN

| LIST OF MODELS | PLEASE SELECT MODEL FROM LIST OF MODELS. |
|---|---|

LIST OF MODELS
MODELS A
  MANUAL OF MACHINE 1
  MANUAL OF MACHINE 2
  MANUAL OF ATTACHED EQUIPMENT 1
  MANUAL OF ATTACHED EQUIPMENT 2
MODELS B
  ....
MODELS C
  ....

PLEASE SELECT MODEL FROM LIST OF MODELS.
PLEASE ENTER A QUERY AND PRESS THE SEARCH BUTTON.
MODELS : MODELS A
QUERY: I WANT TO KNOW OPERATION PROCEDURE OF ATTACHED EQUIPMENT

[SEARCH]

SEARCH RESULT:
Attached equipment manual 1   Chapter dd, Section ee, Paragraph ff, Title 2
Content 2

Attached equipment manual 1   Chapter gg, Section hh, Paragraph jj, Title 3
Content 3

Attached equipment manual 1   Chapter kk, Section mm, Paragraph nn, Title 4
Content 4

Machine manual 1   Chapter aa, Section bb, Paragraph cc, Title 1
Content 1

....

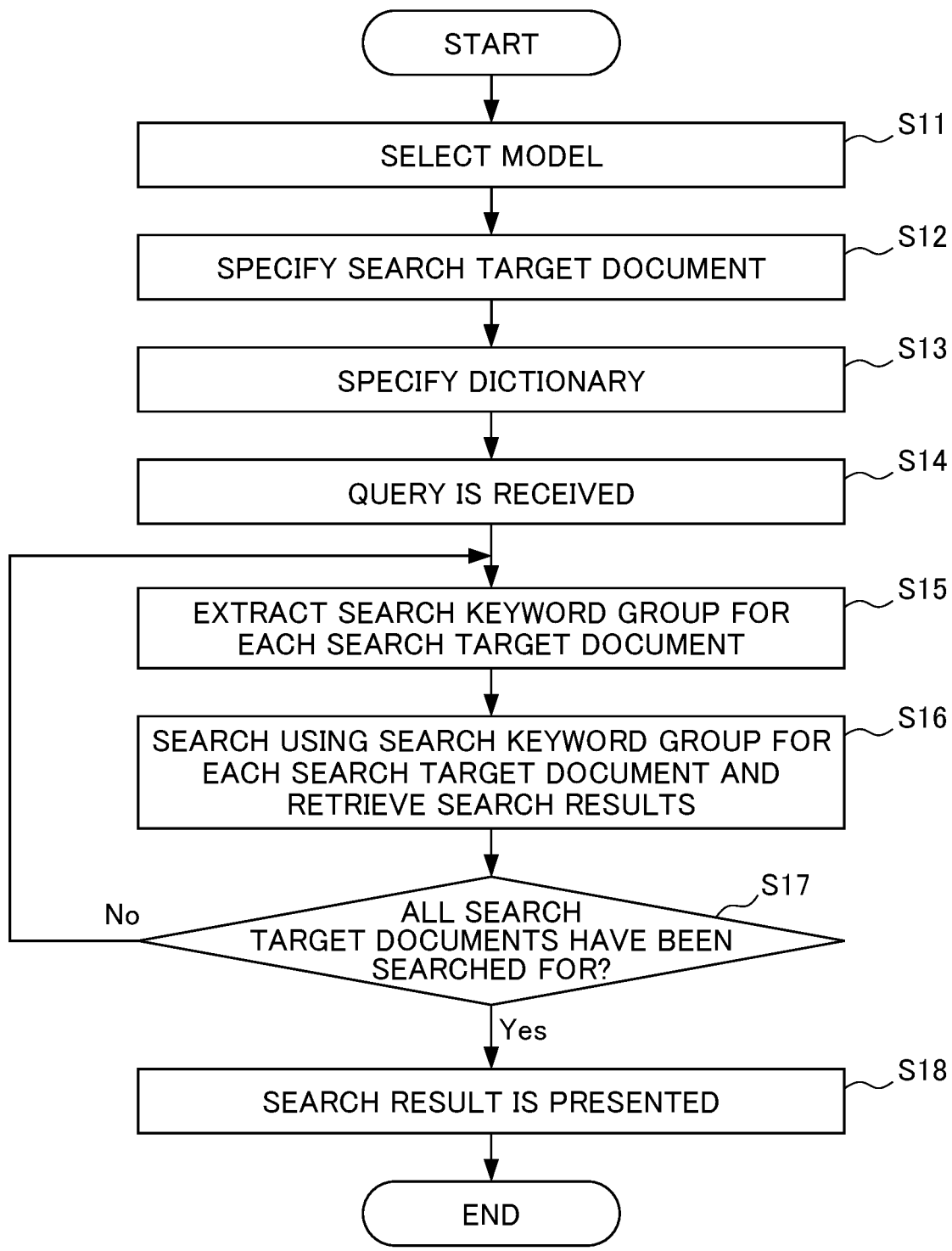

| MACHINE | MODELS |
|---|---|
| MACHINE UNIT 1 | MODELS A |
| MACHINE UNIT 2 | MODELS B |
| MACHINE UNIT 3 | MODELS C |
| .... | .... |

DOCUMENT RETRIEVAL APPARATUS AND DOCUMENT RETRIEVAL METHOD

This application is based on and claims the benefit of priority from. Japanese Patent Application No. 2019-108684, filed on 11 Jun. 2019, the content of which is incorporated herein by reference.

BACKGROUND OF THE INVENTION

Field of the Invention

The present invention relates to a document retrieval apparatus and a document retrieval method.

RELATED ART

According to the known art, when using a product such as an industrial machine and an electronic device, an operator, a manager and other users refer to various types of documents including an instruction manual and a maintenance manual as necessary. A document of this type contains technical details related to a large number of components and portions (e.g., a controller, software and machine parts) of the subject product. It is therefore difficult to find a desired description even with reference to a table of contents or an index. To address this problem, digitization of documents has been promoted and full text search technologies have been developed. However, it is still difficult to find a description suiting a purpose in search results extracted through a keyword search.

For example, according to a known technique to create search keywords, a sentence is divided into words, an unnecessary word dictionary is used to exclude words that are unnecessary as search keywords from the words resulting from the division, and the remaining words are adopted as the search keywords (see, for example, Patent Document 1). For example, "xxxx" is substantially used as the search keyword in response to a query such as "I want to know the operation procedure of xxxx". When an instruction manual of the apparatus is not described using "xxxx" but using "yyyy" which is a technical term having the same meaning as "xxxx", a user may be unable to retrieve a target description. Such a situation may occur frequently when different technical terms are used for respective models, for example.

In this respect, a technique in which, when retrieving an instruction manual, an operation guidance, and the like of an electric device, a similar word dictionary related to the electric device is stored in advance in a storage unit, a search word input from a user is retrieved from the similar word dictionary, and when the search word is included in a similar word group of the similar word dictionary, the instruction manual, the operation guidance, and the like are searched using a keyword corresponding to the similar word group (for example, see Patent Document 2). By doing so, even when a user does not know the formal name having the same meaning as a desired item, it is possible to retrieve the desired item easily. However, Patent Document 2 merely discloses a technique in which a similar word dictionary is provided for each category (field), and the instruction manual, the operation guidance, and the like use a similar word dictionary for each category (field). Therefore, when the terms used in an instruction manual, an operation guidance, and the like are different from one model (and/or manufacturer) to another (for example, abbreviations, terms unique to manufacturers are used) in an industrial machine including a machine tool, a robot, and the like, for example, it may be difficult for the user to retrieve a desired item.

Patent Document 1: Japanese Unexamined Patent Application, Publication No. H6-309362
Patent Document 2: Japanese Unexamined Patent Application, Publication No. 2002-358312

SUMMARY OF THE INVENTION

There has been a demand for a document retrieval apparatus capable of efficiently presenting a target document desired by a user without the user being conscious of whether a term unique to a model such as a machine tool, an industrial machine, and the like, for example, will be used as a search keyword when the user makes a query in a natural language to retrieve various documents related to the model.

(1) An aspect of the present disclosure relates to a document retrieval apparatus including: a document storage area that stores documents applied to a model; a dictionary storage area that stores dictionaries; a model-document correspondence storage unit that stores a correspondence between a model and documents applied to the model; a document-dictionary correspondence storage unit that stores a correspondence between the document and dictionaries applied to the document; and a control unit, wherein the control unit includes: a model selecting unit that selects a model; a search target document specifying unit that specifies documents applied to the model selected by the model selecting unit as search target documents by referring to the model-document correspondence storage unit; a dictionary specifying unit that specifies dictionaries applied to the search target document specified by the search target document specifying unit by referring to the document-dictionary correspondence storage unit; a query receiving unit that inputs a query; a search keyword extraction unit that, extracts a search keyword group by applying the dictionary specified by the dictionary specifying unit to the query input from the query receiving unit; a retrieving unit that retrieves the search target document specified by the search target document specifying unit using the search keyword group extracted by the search keyword extraction unit; and a retrieval result presenting unit that displays search results retrieved by the retrieving unit.

(2) An aspect of the present disclosure relates to a document retrieving method for causing a computer to execute processing, the computer including: a document storage area that stores documents applied to a model; a dictionary storage area that stores dictionaries; a model-document correspondence storage unit that stores a correspondence between a model and documents applied to the model; and a document-dictionary correspondence storage unit that stores a correspondence between the document and dictionaries applied to the document, the processing including: a model selecting step of selecting model; a search target document specifying step of specifying documents applied to the model selected in the model selecting step as search target documents by referring to the model-document correspondence storage unit; a dictionary specifying step of specifying dictionaries applied to the search target document specified in the search target document specifying step by referring to the document-dictionary correspondence storage unit; a query input step of inputting a query; a search keyword extraction step of extracting a search keyword group by applying the dictionary specified in the dictionary specifying step to the query input in the query input step; a retrieving step of retrieving the search target document specified in the search target document specifying step using the search keyword group extracted in the search keyword extraction step; and a search result presentation step of presenting search results retrieved in the retrieving step.

According to an aspect, it is possible to efficiently present a target document desired by a user without the user being conscious of whether a term unique to a model such as a machine tool, an industrial machine, and the like, for example, will be used as a search keyword when the user makes a query in a natural language to retrieve various documents related to the model.

BRIEF DESCRIPTION OF THE DRAWINGS

FIG. 2 is a diagram illustrating an example of a table illustrating a correspondence between a model according to an embodiment and an example of a document applied to the model.

FIG. 3A is a diagram illustrating an example of a table illustrating a correspondence between a document according to an embodiment and a dictionary applied to the document.

FIG. 3B is a diagram illustrating an example of a table illustrating a correspondence between a document according to an embodiment and a dictionary applied to the document.

FIG. 4 is a diagram illustrating a user interface related to a retrieval screen according to an embodiment.

FIG. 7 is a diagram illustrating an example of a user interface screen for presenting search results provided by a retrieval result presenting unit 17 according to an embodiment.

FIG. 8 is a flowchart illustrating processes in which a document retrieval apparatus according to an embodiment selects a model, retrieves a document applied to the model on the basis of an input query, and presents search results to a user.

DETAILED DESCRIPTION OF THE INVENTION

First Embodiment

Figure 1:
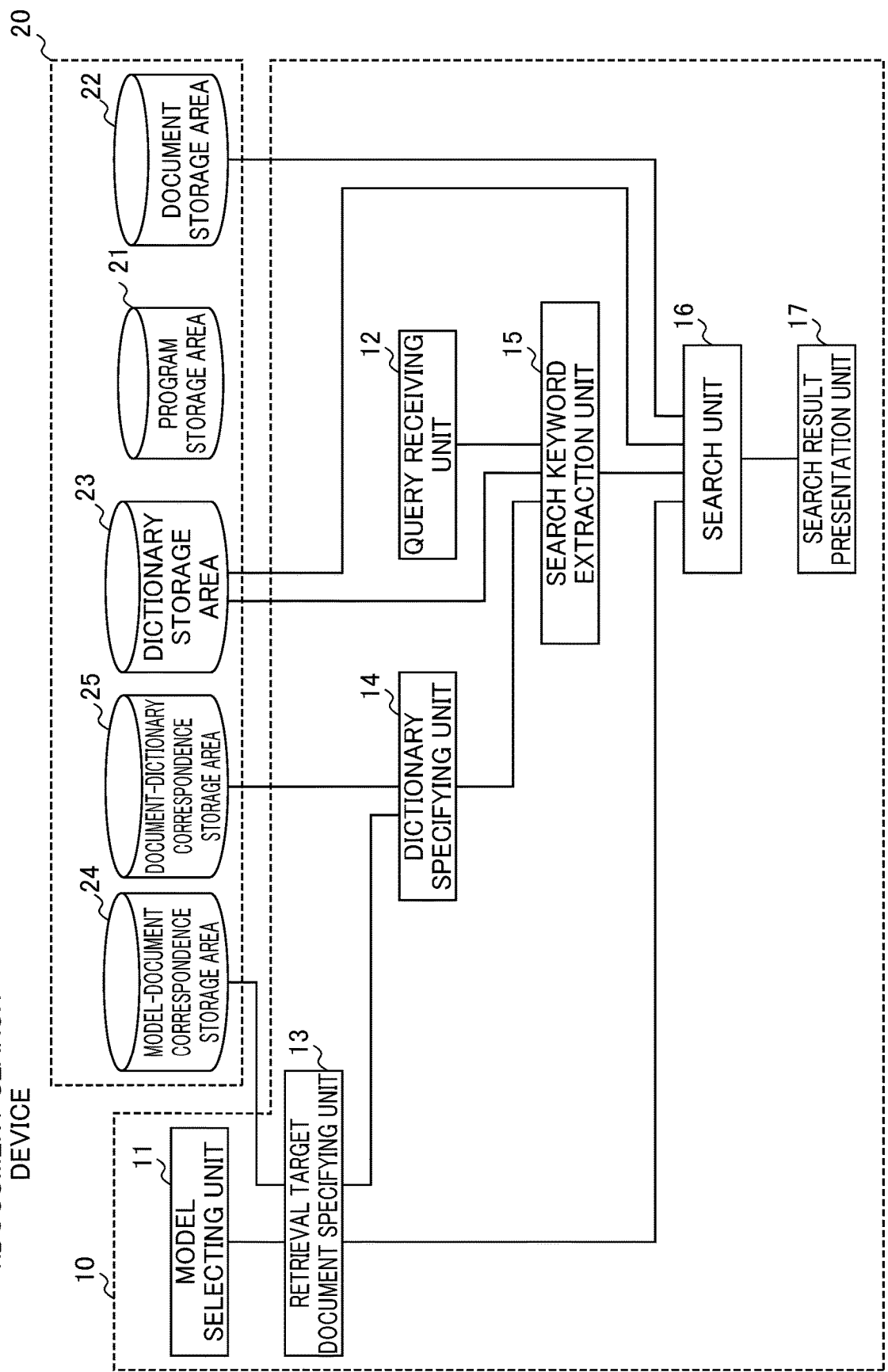
FIG. 1 is a block diagram illustrating a functional configuration of a document retrieval apparatus according to an embodiment.

Hereinafter, a first embodiment which is an example of an embodiment of the present invention will be described. FIG. 1 is a block diagram illustrating a functional configuration of a document retrieval apparatus 1 according to the present embodiment. The document, retrieval apparatus 1 is an information processing device including a control unit 10, a storage unit 20, and various interfaces including an input/output interface and a communication interface. The document retrieval apparatus 1 may be implemented as various electronic devices such as a server, a personal computer, a smartphone, a tablet terminal, a game console, a navigation device, or a home appliance.

The control unit 10 is a unit that controls the entire document retrieval apparatus 1 and realizes various functions of the present embodiment by reading and executing various programs stored in the storage unit 20 appropriately. The control unit 10 may be a CPU.

The storage unit 20 may be a storage area of various programs for causing a group of hardware to function as the retrieving device 1 and various pieces of data and may be a ROM, a RAM, a flash memory, or a hard disk (HDD). Specifically, the storage unit 20 includes a program storage area 21 that stores a search program for causing the control unit 10 to execute various functions of the present embodiment, a document storage area 22 as a document storage unit, a dictionary storage area 23 as a dictionary storage unit, a model-document correspondence storage area 24 as a model-document correspondence storage unit, and a document-dictionary correspondence storage area 25 as a document-dictionary correspondence storage unit.

Document (for example, an instruction manual of a machine related to the model, a maintenance manual of a machine related to the model, an instruction manual of attached equipment related to the model, and a maintenance manual of attached equipment related to the model) applied to a search target model are stored in the document storage area 22. The documents include a document applied in common to a plurality of models and unique documents applied to respective models. Each of the documents stored in the document storage area 22 is assigned with identification information (for example, a document ID, a document name, or a document file name) for uniquely identifying the document.

Dictionaries (for example, a synonym dictionary, a similar word dictionary, and the like) applied to the documents (for example, an instruction manual of a machine related to the model, a maintenance manual of a machine related to the model, an instruction manual of attached equipment related to the model, and a maintenance manual of attached equipment related to the model) are stored in the dictionary storage area 23. For example, when a document applied to a search target model is "manual of attached equipment", the manual needs to be described using a term "attached equipment". For example, when a term "attached facility" which is a synonym or a similar word of "attached equipment" is not used, "attached equipment" needs to be described as a synonym or a similar word of "attached facility" in a dictionary applied to the document. In this manner, the dictionaries applied to a document applied to a search target model mean dictionaries in which a term used in the document is correlated with a synonym or a similar word of the term. Moreover, the dictionary may include a common dictionary common to respective documents and unique dictionaries applied to respective documents or a plurality of document groups. Each of the dictionaries stored in the dictionary storage area 23 is assigned with identification information (for example, a dictionary ID, a dictionary name, or a dictionary file name) for uniquely identifying the dictionary.

A correspondence between a model and a document applied to the model is stored in the model-document correspondence storage area 24. Each model is assigned with identification information (for example, a model ID or a model name) for uniquely identifying a model. FIG. 2 illustrates a table illustrating a correspondence between a model and a manual as an example of a document applied to the model. Referring to FIG. 2, four documents (manuals) are applied to Model A, the documents including: Manual 1 (for example, an instruction manual of a machine) of a machine related to Model A; Manual 2 (for example, a maintenance manual of a machine) of a machine related to Model A; Manual 1 (for example, an instruction manual of an attached equipment) of attached equipment related to Model A; and Manual 2 (for example, a maintenance manual of attached equipment) of attached equipment related to Model A. As described above, a document (a manual) may be applied in common to a plurality of models, and in the example illustrated in FIG. 2, Manual 2 of a machine is applied in common to Models A and C.

A correspondence between a manual as an example of a document and a dictionary applied to the document is stored in the document-dictionary correspondence storage area 25. FIGS. 3A and 3B illustrate a table illustrating a correspondence between a document and a dictionary applied to the document. Referring to FIG. 3A, Dictionary 1 is applied to Manual 1 of a machine, Dictionary 2 is applied to Manual 2 of a machine, Dictionary 11 is applied to Manual 1 of an attached equipment, and Dictionary 12 is applied to Manual 2 of attached equipment. As described above, a dictionary may include a common dictionary common to respective documents and unique dictionaries applied to respective documents or a plurality of document groups. In such a case, as illustrated in FIG. 3B, a common dictionary and individual dictionaries may be correlated as a dictionary applied to a manual. Referring to FIG. 3B, a common dictionary and Individual dictionary 1 are applied to Manual 1 of a machine, a common dictionary and Individual dictionary 2 are applied to Manual 2 of a machine, a common dictionary and Individual dictionary 11 are applied to Manual 1 of attached equipment, and a common dictionary and Individual dictionary 12 are applied to Manual 2 of attached equipment. Information indicating a document in the model-document correspondence storage area 24 and information indicating a document in the document-dictionary correspondence storage area 25 preferably have the same value. For example, when a document name is stored in the model-document correspondence storage area 24 as information indicating a document, the same document name as that stored in the model-document correspondence storage area 24 is preferably stored as information indicating the document in the document-dictionary correspondence storage area 25.

All of some of these storage areas including the document storage area 22 to the document-dictionary correspondence storage area 25 may be provided outside the document retrieval apparatus 1. For example, the document storage area 22 and/or the dictionary storage area 23 may be provided in a place physically distant from the document retrieval apparatus 1 and may be read and written (input and output) by communication via a network with the document retrieval apparatus 1.

The control unit 10 includes a model selecting unit 11, a query receiving unit 12, a search target document specifying unit 13, a dictionary specifying unit 14, a search keyword extraction unit 15, and a retrieval result presenting unit 17 and outputs search results of an appropriate document with respect to a query from a user with the aid of these functional units.

The model selecting unit 11 presents an interface for selecting a model to a user via a display unit (not illustrated) included in the document retrieval apparatus 1, for example. Specifically, for example, the model selecting unit 11 provides an interface for selecting a search target model. FIG. 4 is a diagram illustrating an example of a user interface related to a retrieval screen. As illustrated in FIG. 4, the model selecting unit 11 may display a list of search target models of the document retrieval apparatus 1. By doing so, a user can select a search target model from a model list. When a model is selected by a user, the machine tool screen display unit 11 may deliver the selected model information to the search target document specifying unit 13 to be described later.

The query receiving unit 12 presents an interface for inputting a query to a user via a display unit (not illustrated) included in the document retrieval apparatus 1, for example. Specifically, for example, the query receiving unit 12 provides an interface for inputting a query from a user, for retrieving a search target document. The query receiving unit 12 may input characters via a keyboard or the like, may input characters via voice, and may input characters obtained by recognizing handwritten characters. A query input method is not particularly limited. Moreover, a query input in the form of a natural sentence may be received from a user. FIG. 4 illustrates an example of an interface for inputting a query provided by the query receiving unit 12. As illustrated in FIG. 4, a user can input a query in the form of a natural sentence (for example, "Want to know an optimization problem of attached equipment"), for example. After that, for example, when a retrieval button is pressed by a user, the query receiving unit 12 may deliver a query to the search keyword extraction unit 15. The query receiving unit 11 may provide an interface for inputting a query after a model is selected by the model selecting unit 11.

The search target document specifying unit 13 specifies a search target document as the documents applied to the model selected by the model selecting unit 11 by referring to a correspondence between the model stored in the model-document correspondence storage area 24 and the documents applied to the model. Specifically, for example, as illustrated in FIG. 4, when Model A is selected, the search target document specifying unit specifies that the search target document applied to Model A include four documents including Manual 1 of a machine, Manual 2 of a machine, Manual 1 of attached equipment, and Manual 2 of attached equipment by referring to a correspondence between the model stored in the model-document correspondence storage area 24 and the documents applied to the model as illustrated in FIG. 2.

The dictionary specifying unit 14 specifies dictionaries applied to the search target document specified by the search target document specifying unit 13 by referring to a correspondence between the document (for example, a manual) stored in the document-dictionary correspondence storage area 25 and the dictionaries applied to the document. Specifically, for example, when Model A is selected similarly to the above-described example, the search target document specifying unit 13 specifies that the search target document includes four documents including Manual 1 of a machine, Manual 2 of a machine, Manual 1 of attached equipment, and Manual 4 of attached equipment. In this case, the dictionary specifying unit 14 can specify that Dictionary 1 is applied to Manual 1 of a machine, Dictionary 2 is applied to Manual 2 of a machine, Dictionary 11 is applied to Manual 1 of attached equipment, and Dictionary 12 is applied to Manual 2 of attached equipment by referring to a correspondence between the document (for example, a manual) stored in the document-dictionary correspondence storage area 25 illustrated in FIG. 3, for example, and the dictionaries applied to the document.

The search keyword extraction unit 15 applies the dictionary specified by the dictionary specifying unit 14 to the query input from the query receiving unit 12 to extract a search keyword group. Specifically, the search keyword extraction unit 15 may extract keywords by dividing a query sentence into words and/or compound words such as idioms using a method such as morphological analysis. The search keyword extraction unit 15 may divide a compound word to extract a keyword. For example, the search keyword extraction unit 15 may extract a search keyword group such as "attached equipment" and "operation method" from a query "Want to know an operation method of attached equipment". Alternatively, the search keyword extraction unit 15 may extract a search keyword group such as "attached equipment", "operation", and "operation method". Alternatively, the search keyword extraction unit 15 may extract a search keyword group such as "attached equipment", "operation", "method", and "operation method". Moreover, the search keyword extraction unit 15 may exclude words (verbs) such as "want to know", for example, from a search keyword group as unnecessary words using an unnecessary word dictionary.

When Model A is selected similarly to the example illustrated in FIG. 2, the search target document specifying unit 13 specifies that the search target document includes four documents including Manual 1 of a machine, Manual 2 of a machine, Manual 1 of attached equipment, and Manual 2 of attached equipment. In this case, similarly to the example illustrated in FIG. 3A, the dictionary specifying unit 14 specifies that Dictionary 1 is applied to Manual 1 of a machine, Dictionary 2 is applied to Manual 2 of a machine, Dictionary 11 is applied to Manual 1 of attached equipment, and Dictionary 12 is applied to Manual 2 of attached equipment.

When Manual 1 of a machine is searched for, the search keyword extraction unit 15 extracts a search keyword group (referred to as search keyword group 1) from a query using Dictionary 1. Similarly, the search keyword extraction unit 15 extracts a search keyword group (referred to as search keyword group 2) from a query using Dictionary 2 when searching for Manual 2 of a machine, extracts a search keyword group (referred to as search keyword group 3) from a query using Dictionary 11 when searching for Manual 1 of attached equipment, and extracts a search keyword group (referred to as search keyword group 4) from a query using Dictionary 12 when searching for Manual 2 of attached equipment.

For example, when a query "Want to know an operation method of attached equipment" is input from the query receiving unit 12, the search keyword extraction unit 15 can extract a search keyword group such as "attached equipment" and "operation method" from the query "Want to know an operation method of attached equipment". The search keyword extraction unit 15 extracts "attached equipment" and "operation method" as a search keyword group if a synonym or a similar word of the extracted "attached equipment" and "operation method" is not stored in Dictionaries 11 and 12.

On the other hand, when a query "Want to know an operation method of attached facility" is input from the query receiving unit 12, the search keyword extraction unit 15 can extract a search keyword group such as "attached facility" and "operation method" from the query "Want to know an operation method of attached facility". In this case, if "attached facility" is stored as a synonym of "attached equipment" in Dictionaries 11 and 12, "attached equipment" is applied to the extracted "attached facility", and "attached equipment" and "operation method" can be extracted as a search keyword group. By doing so, even when a user inputs a query using "attached facility" as a keyword with respect to Manual 1 of attached equipment and Manual 2 of attached equipment described using the term "attached equipment", the search keyword extraction unit 15 can extract a keyword of "attached equipment" appropriate to the documents applied to Model A. In this way, it is possible to efficiently retrieve a target document desired by the user. The retrieving unit 16 to be described later retrieves the search target document specified by the search target document specifying unit 13 using the search keyword group extracted by the search keyword extraction unit 15. In this case, the search keyword group to be used may be a group consisting of a keyword used in the search target document among the keywords extracted from a query and a term (a new keyword) used in the search target document extracted when the keyword is a synonym or a similar word of the term used in the search target document. Specifically, for example, when "attached facility" is not used in the search target document (Manual 1 of attached equipment) and "attached facility" is registered as a synonym of "attached equipment" in a dictionary (Dictionary 11) applied to the search target document, "attached equipment" may be extracted as the search keyword group instead of "attached equipment". In contrast, for example, when "attached facility" is used in the search target document (Manual 1 of attached equipment) and "attached facility" is registered as a synonym of "attached equipment" in a dictionary (Dictionary 11) applied to the search target document, "attached equipment" may be extracted as a search keyword group in addition to "attached facility". When a keyword extracted from a query and a keyword which is a synonym or a similar word of the keyword are present in a dictionary applied to the search target document, a group in which the synonym or the similar word of the keyword is added to the keyword extracted from the query may be used as a search keyword group. In this case, when a plurality of keywords extracted on the basis of a dictionary is present for a keyword extracted from a query, these terms are preferably searched by an OR operation.

The retrieving unit 16 retrieves the search target document specified by the search target document specifying unit 13 using the search keyword group extracted by the search keyword extraction unit 15. Specifically, for example, when Model A is selected similarly to the above-described example, the retrieving unit 16 retrieves Manual 1 of a machine using search keyword group 1 to acquire search results. Similarly, the retrieving unit 16 retrieves Manual 1 of a machine using search keyword group 2 to acquire search results, retrieves Manual 1 of attached equipment using search keyword group 3 to acquire search results, and retrieves Manual 2 of attached equipment using search keyword group 4 to acquire search results.

The retrieval result presenting unit 17 displays the search results retrieved by the retrieving unit 16. Specifically, for example, it is assumed that Model A has been selected similarly to the above-described example, and the retrieving unit 16 has acquired a retrieval result of Manual 1 of a machine, a retrieval result of Manual 2 of a machine, a retrieval result of Manual 1 of attached equipment, and a retrieval result of Manual 2 of attached equipment. In this case, the retrieval result presenting unit 17 displays the retrieval result of Manual 1 of a machine, the retrieval result of Manual 2 of a machine, the retrieval result of Manual 1 of attached equipment, and the retrieval result of Manual 2 of attached equipment via a display unit (not illustrated) included in the document retrieval apparatus 1, for example.

Figure 5:
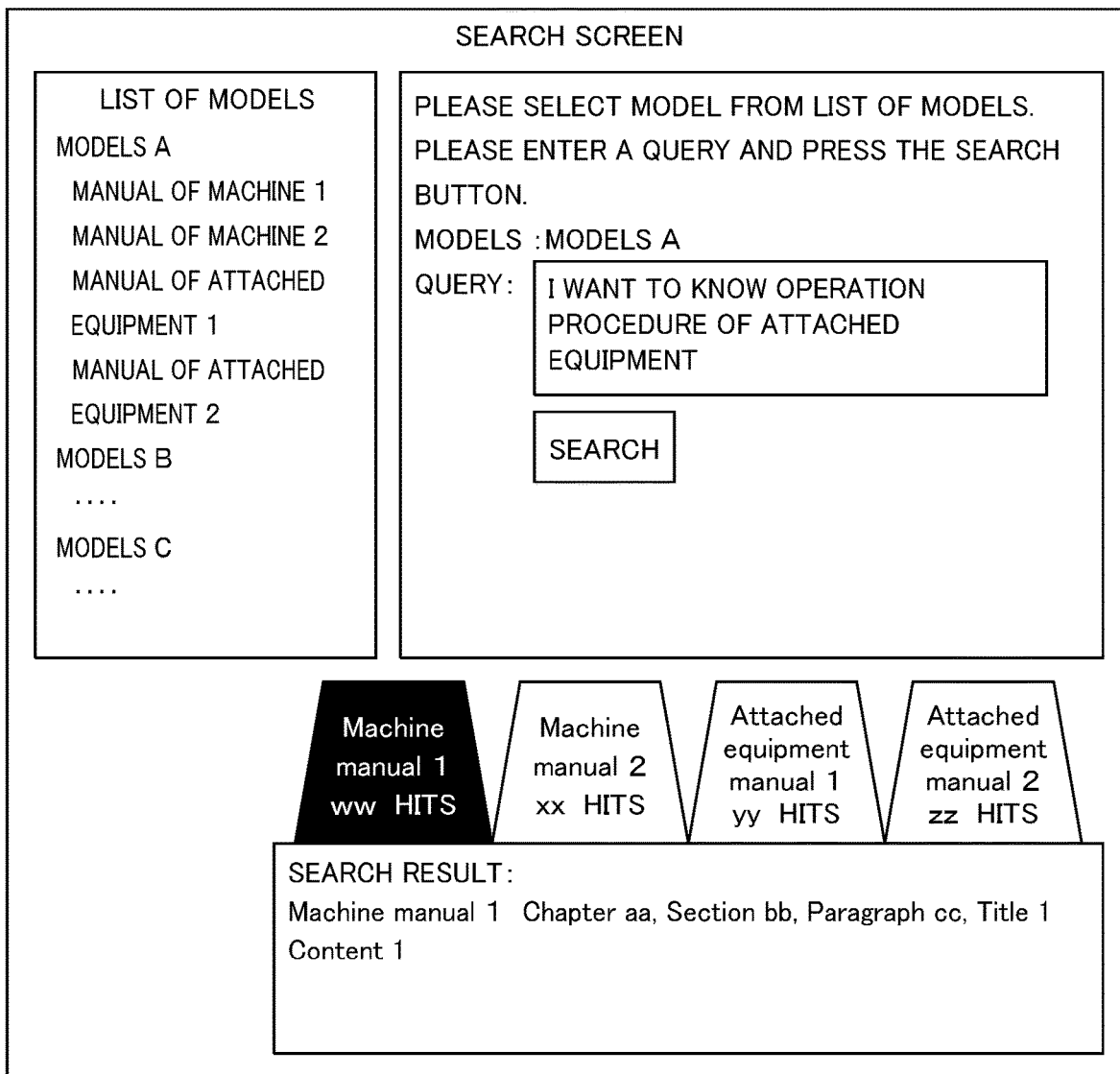
FIG. 5 is a diagram illustrating an example of a user interface screen for presenting search results provided by a retrieval result presenting unit 17 according to an embodiment.
Figure 6:
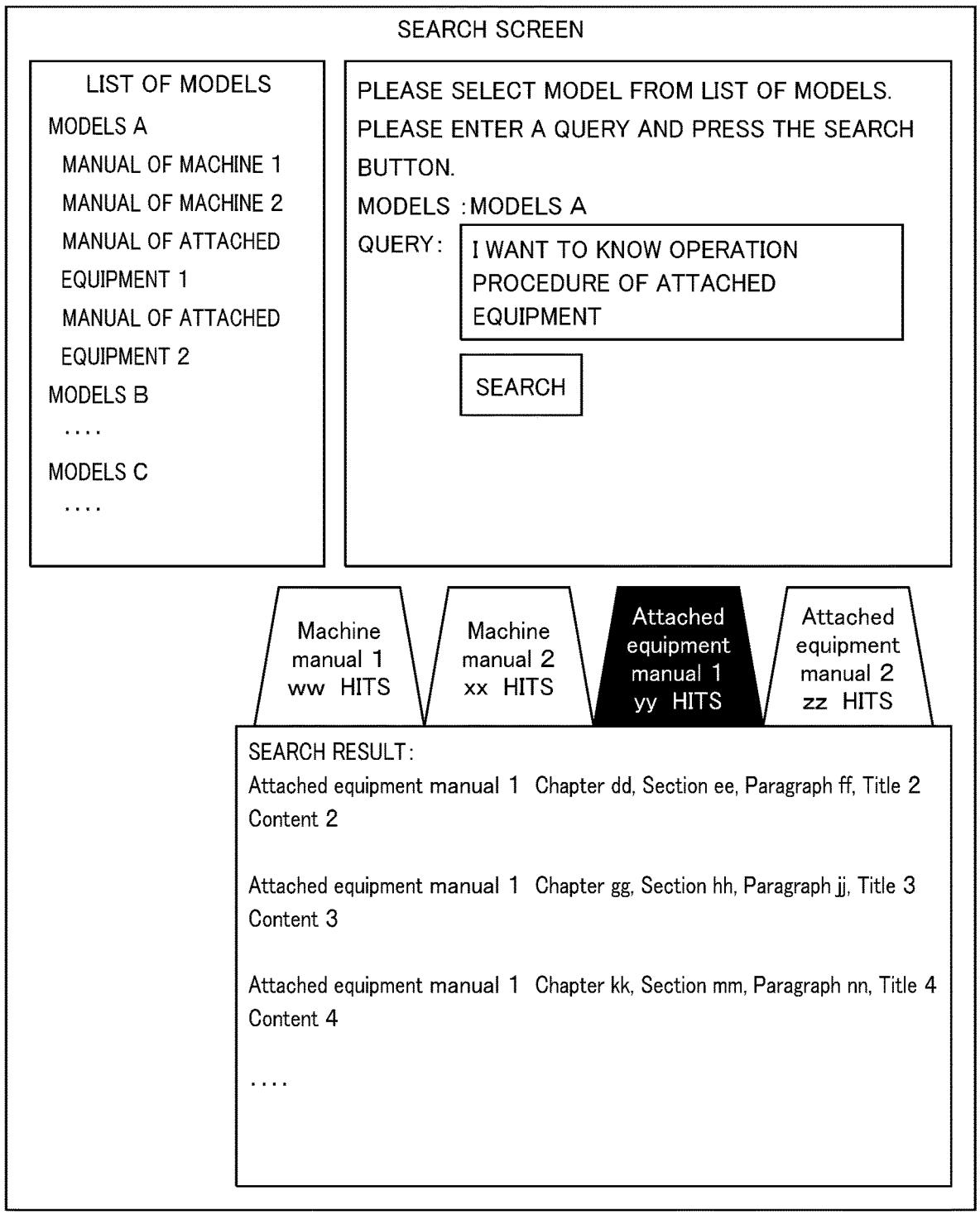
FIG. 6 is a diagram illustrating an example of a user interface screen for presenting search results provided by a retrieval result presenting unit 17 according to an embodiment.

FIGS. 5 and 6 are diagrams illustrating an example of a user interface screen for presentation of search results provided by the retrieval result presenting unit 17. As illustrated in FIGS. 5 and 6, the retrieval result presenting unit 17 may provide tabs corresponding to respective documents, and when a tab is clicked, may display a retrieval result of a document corresponding to the tab. The user interface screen for presentation of search results illustrated in FIGS. 5 and 6 illustrates a display example in which Model A is selected similarly to the above-described example, and the search results of Manual 1 of a machine, Manual 2 of a machine, Manual 1 of attached equipment, and Manual 2 of attached equipment are displayed.

As illustrated in FIGS. 5 and 6, the retrieval result presenting unit 17 may display the retrieval result of Manual 1 of a machine when the leftmost tab (Machine manual 1) is selected, display the retrieval result of Manual 2 of a machine when the second tab from left (Machine manual 2) is selected, display the retrieval result of Manual 1 of attached equipment when the third tab from left (Attached equipment manual 1) is selected, and display the retrieval result of Manual 2 of attached equipment when the fourth tab from left (the rightmost tab) (Attached equipment Manual 2) selected. The details will be described later.

Moreover, as illustrated in FIGS. 5 and 6, the retrieval result presenting unit 17 may display the number of hits on each tab. By doing so, the number of hits of ww for Manual 1 of a machine is displayed on the leftmost tab (Machine manual 1), the number of hits of xx for Manual 2 of a machine is displayed on the second tab from left (Machine manual 2), the number of hits of yy for Manual 1 of attached equipment is displayed on the third tab from left (Attached equipment manual 1), and the number of hats of zz for Manual 2 of attached equipment is displayed on the fourth tab from left (the rightmost tab) (Attached equipment manual 2). The position at which the number of hits is displayed is not limited to a tab. The user interface screen may be set appropriately so that the number of hits is displayed at an arbitrary position other than a tab.

Next, the display content of search results will be described. As illustrated in FIGS. 5 and 6, the retrieval result presenting unit 17 may display an overview of a document hit as the retrieval result under a tab. FIG. 5 illustrates a case in which the leftmost tab (Machine manual 1) is selected and the search results of Manual 1 of a machine are displayed. In this case, since the query is "Want to know an optimization problem of attached equipment", there is little description of an operation method of attached equipment in Manual 1 of a machine, and the followings are displayed as the search results.

Machine manual 1, Chapter aa, Section bb, Paragraph cc, Title 1
Content 1

As illustrated in FIG. 5, "Machine manual 1, Chapter aa, Section bb, Paragraph cc, Title 1" is for presentation of the location of a retrieval result. Here, "Machine manual 1" presents the name of a document, and "Chapter aa, Section bb, Paragraph cc" presents a description location (chapter, section, and paragraph) of "Machine manual 1", and "Title 1" presents the name of chapter, section, and paragraph attached to "Chapter aa, Section bb, Paragraph cc". The retrieval result presenting unit 17 may present a page number of a document instead of presenting chapter, section, and paragraph such as "Chapter aa, Section bb, Paragraph cc" when presenting the description location. Moreover, presentation of chapter, section, and paragraph and presentation of a page number may be used together. Moreover, when presenting chapter, section, and paragraph, "Chapter aa, Section bb, Paragraph cc" may be presented in the form of "aa-bb-cc", "aa-bb-cc-", "aa.bb.cc", "aa.bb.cc.", "aa_bb_cc", or "aa_bb_cc_", with separators such as "-", ".", "_" and the like added between chapter and section, between section and paragraph, or after paragraph.

Furthermore, when presenting the name of chapter, section, and paragraph of a document, the retrieval result presenting unit 17 may add the name of previous chapter or the name of previous chapter and section to the name of chapter, section, and paragraph. For example, when the followings are described in a search target document,
Chapter 1: WWWW
Chapter 1, Section 1: xxxx
Chapter 1, Section 1, Paragraph 1: Operation method
. . . . . .
Chapter 2: YYYY
Chapter 2, Section 1: zzzz
Chapter 2, Section 1, Paragraph 1: operation method
. . . . . .
if the name of chapter, section, and paragraph only is presented as the location of a document, for example, Chapter 1, Section 1, Paragraph 1 corresponds to "Chapter 1, Section 1, Paragraph 1: Operation method", and Chapter 2, Section 1, Paragraph 1 corresponds to "Chapter 2, Section 1, Paragraph 1: Operation method". Therefore, it may be difficult to understand what the operation method is for. Therefore, as described above, when the name of chapter, the name of chapter and section, and the name of chapter, section, and paragraph are added in the search target document, since the chapter name or the chapter and section name often indicates an operation target, it may be easy to understand the operation target if the chapter name or the chapter and section name is added when presenting the chapter, section, and paragraph name. Therefore, in this case, the retrieval result presenting unit 17 may add the name of Chapter 1 or the name of Chapter 1 and Section 1 when presenting the name of Chapter 1, Section 1, and Paragraph 1 so that "xxxx: Operation method" or "WWWW, xxxx: Operation method" is presented. When adding the chapter name or the chapter and section name, a space or a mark such as "," or "," may be put between the chapter name and the chapter, section, and paragraph name to separate the names. Moreover, the retrieval result presenting unit 17 may add the name of previous chapter when presenting a chapter and section name.

Since the name of a document of a retrieval result such as "Machine manual 1" is displayed on each tab, the retrieval result presenting unit 17 may not display the name of a document when presenting the description location. For example, referring to FIG. 5, as in the leftmost tab (Machine manual 1), "Chapter aa, Section bb, Paragraph cc, Title 1" may be displayed on the tab instead of "Machine manual 1, Chapter aa, Section bb, Paragraph cc, Title 1" as a retrieval result that displays the name of a document of a retrieval result such as "Machine manual 1".

Next, presentation (display) of a description content corresponding to a query will be described. As illustrated in FIG. 5, "Content 1" displayed in a retrieval result presents a description content of "Machine manual 1, Chapter aa, Section bb, Paragraph cc". When presenting a description content of a document, the retrieval result presenting unit 17 may not need to present all content of the description location obtained as a retrieval result but may present a portion (for example, a heading part) of the location.

In FIG. 5, for example, the retrieval result presenting unit 17 may attach a link to "Machine manual 1, Chapter aa, Section bb, Paragraph cc" in the document storage area 22 to the portion. "Machine manual 1, Chapter aa, Section bb, Paragraph cc" or the portion "Machine manual 1, Chapter aa, Section bb, Paragraph cc, Title 1" of the retrieval result. Alternatively, the retrieval result presenting unit 17 may display a button having a link set therein together with the retrieval result. Alternatively, the retrieval result presenting unit 17 may present the location of "Machine manual 1, Chapter aa, Section bb, Paragraph cc" as an attachment file and display a button for opening the attachment file together with the retrieval result.

Furthermore, in order to indicate of which document, the retrieval result is presented, as illustrated in FIG. 5, when the leftmost tab (Machine manual 1), for example, is selected presently, the retrieval result presenting unit 17 may display the leftmost tab (Machine manual 1) in such a manner that black and white are reversed. Indication of a tab selected presently is not limited to the black-and-white reversal of the tab. For example, in order to indicate a tab selected presently, the retrieval result presenting unit 17 may apply various methods such as changing the color of a tab, changing the color of characters, or changing the form of a tab.

FIG. 6 illustrates a case in which the third tab from left (Attached equipment manual 1) is selected, and the retrieval result of Manual 1 of attached equipment is displayed. As described above, when the query is "Want to know an operation method of attached equipment", the number of locations related to operation description in Manual 1 of attached equipment is displayed as search results. The display content of the respective search results is similar to the content described with reference to FIG. 5.

As illustrated in FIG. 6, when a plurality of search results are acquired, the retrieval result presenting unit 17 preferably displays a retrieval result close to the query on an upper place. In order to display a retrieval result close to a query on an upper place, the retrieval result presenting unit 17 may calculate the degree of matching of a retrieval result with respect to the query and may display a retrieval result having a higher degree of matching on an upper place. Here, the degree of matching may be the sum of the numbers of appearance of keywords i ($1 \leq i \leq n$) included in the search keyword group in a description location (for example, chapter, section, and paragraph, or a page) of a search target document which is a retrieval result obtained using the search keyword group, for example. That is, when keyword 1 appears N1 times, keyword 2 appears N2 times, . . . , and keyword n appears Nn times in a description location, the degree of matching may be the sum of N1 to Nn. The degree of matching is not limited thereto. For example, the degree of matching may be calculated by applying a weight to a keyword. Moreover, displaying a retrieval result on an upper place means that, for example, when search results are displayed on a user interface screen from top to bottom, the retrieval result is displayed on the upper side. Moreover, when search results are displayed on a user interface screen from left to right, displaying a retrieval result on an upper place means displaying the same on the left side of the user interface screen.

Hereinabove, a form in which tabs corresponding to documents are provided, and when a tab is clicked, a retrieval result of a document corresponding to the tab is displayed has been described as an example of a user interface screen for presentation of search results provided by the retrieval result presenting unit 17. In contrast, search results may be displayed collectively as a user interface screen for presentation of search results provided by the retrieval result presenting unit 17.

FIG. 7 is a diagram illustrating an example of a user interface screen for presentation of search results provided by the retrieval result presenting unit 17. FIG. 7 illustrates a display example in which Model A is selected similarly to the above-described example, and search results of Manual 1 of a machine, Manual 2 of a machine, Manual 1 of attached equipment, and Manual 2 of attached equipment are displayed. As illustrated in FIG. 7, the retrieval result presenting unit 18 displays the search results of Manual 1 of a machine, Manual 2 of a machine, Manual 1 of attached equipment, and Manual 2 of attached equipment in a collective manner. In this case, as described above, similarly to FIG. 6, the retrieval result presenting unit 17 preferably displays a retrieval result close to a query on an upper place. As illustrated in FIGS. 5 and 6, as a user interface screen for presentation of search results, the retrieval result presenting unit 17 may provide tabs corresponding to respective documents and provide an operation button (not illustrated) for switching a user interface screen so that when a tab is clicked, a user interface screen that displays a retrieval result of a document corresponding to the tab and a user interface screen that displays search results in a collective manner as illustrated in FIG. 7 can be switched. Moreover, when a display unit (not illustrated) is a touch panel, the user interface screen may be switched by a swipe operation or the like, for example. Hereinabove, the configuration of respective functional units of the document retrieval apparatus 1 according to the first embodiment has been described.

Next, with reference to the flowchart of FIG. 8, the operation of the document retrieval apparatus 1 when the document retrieval apparatus 1 includes the model selecting unit 11, the query receiving unit 12, the search target document specifying unit 13, the dictionary specifying unit 14, the search keyword extraction unit 15, the retrieving unit 16, and the retrieval result presenting unit 17 will be described. FIG. 8 is a flowchart illustrating processes in which the document retrieval apparatus 1 selects a model, retrieves a document applied to the model on the basis of an input query, and presents search results to a user.

In step S11, the model selecting unit 11 selects a search target model.

In step S12, the search target document specifying unit 13 specifies a search target document applied to the model selected step S11 by referring to a correspondence between the model and the document applied to the model stored in the model-document correspondence storage area 24.

In step S13, the dictionary specifying unit 14 specifies a document applied to the search target document specified in step S12 by referring to a correspondence between the document (for example, a manual) and a dictionary applied to the document stored in the document-dictionary correspondence storage area 25.

In step S14, the query receiving unit 12 inputs a query for retrieving a search target document.

In step S15, the search keyword extraction unit 15 applies the dictionary specified in step S13 to the search target document that has been specified in step S12 and has not been searched for to extract a search keyword group for the query input in step S14.

In step S16, the retrieving unit 16 performs retrieval using the search keyword group extracted in step S15 for the respective search target documents to acquire search results for respective search target documents.

In step S17, the retrieving unit 16 determines whether all search target documents have been searched for. When all search target documents have been searched for (In case of Yes), the flow proceeds to step S18. When a non-searched search target document is present (in case of No), the flow proceeds to step S15.

In step S18, the retrieval result presenting unit 17 displays the search results acquired in step S16. After that, the process ends. Hereinabove, the operation of the document retrieval apparatus 1 when the document retrieval apparatus 1 includes the model selecting unit 11, the query receiving unit 12, the search target document specifying unit 13, the dictionary specifying unit 14, the search keyword extraction unit 15, the retrieving unit 16, and the retrieval result presenting unit 17 has been described.

Second Embodiment

In the document retrieval apparatus 1 according to the first embodiment, the model selecting unit 11 acquires model information input by a user. In contrast, in the second embodiment, the document retrieval apparatus 1 is communicably connected to one or more machines via a network. With this configuration, a user retrieves documents applied to machines communicably connected to the document retrieval apparatus 1. Constituent components of the second embodiment different from those of the first embodiment will be described, and description of the same constituent components as those of the first embodiment will be omitted.

Figure 9:
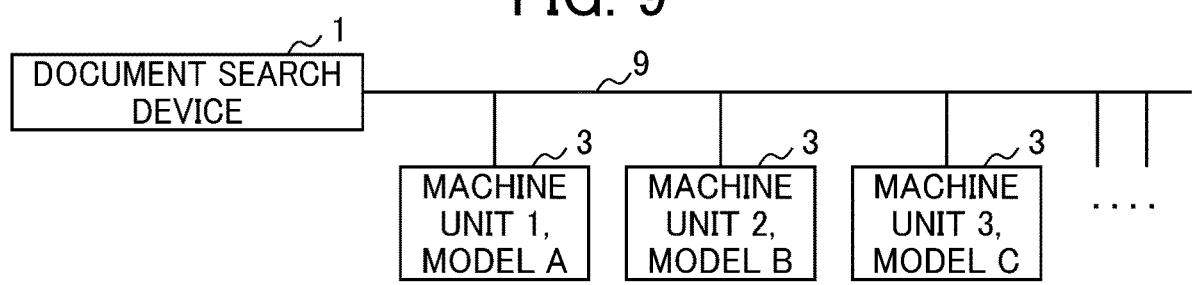
FIG. 9 is a diagram illustrating a configuration in which a document retrieval apparatus according to an embodiment is network-connected to one or more machines.

FIG. 9 is a diagram illustrating a configuration in which the document retrieval apparatus 1 and one or more machines 3 are network-connected via a network 9. Although not illustrated in the drawing, the document retrieval apparatus 1 and the machines 3 may be communicably connected by an interface connection or the like. Therefore, the document retrieval apparatus 1 may include a communication unit (not illustrated) including a receiving unit. In this case, the user may be an operator who operates the machine 3. Moreover, the machine 3 may include a display unit (not illustrated) and an output destination of the query input from a user and the search results of the retrieval result presenting unit 17 of the document retrieval apparatus 1 may be the display unit included in the machine. Specifically, for example, a client-server system in which the machine 3 is configured as a client and the document retrieval apparatus 1 is configured as a server or a WEB system in which the machine 3 is a WEB terminal and the document retrieval apparatus 1 is a WEB server may be employed. By doing so, the query receiving unit 12 of the document retrieval apparatus 1 can provide an interface screen for allowing a user to input a query via the machine 3. Similarly, the retrieval result presenting unit 17 of the document retrieval apparatus 1 can provide an interface screen for presenting search results to a user.

Figure 10:
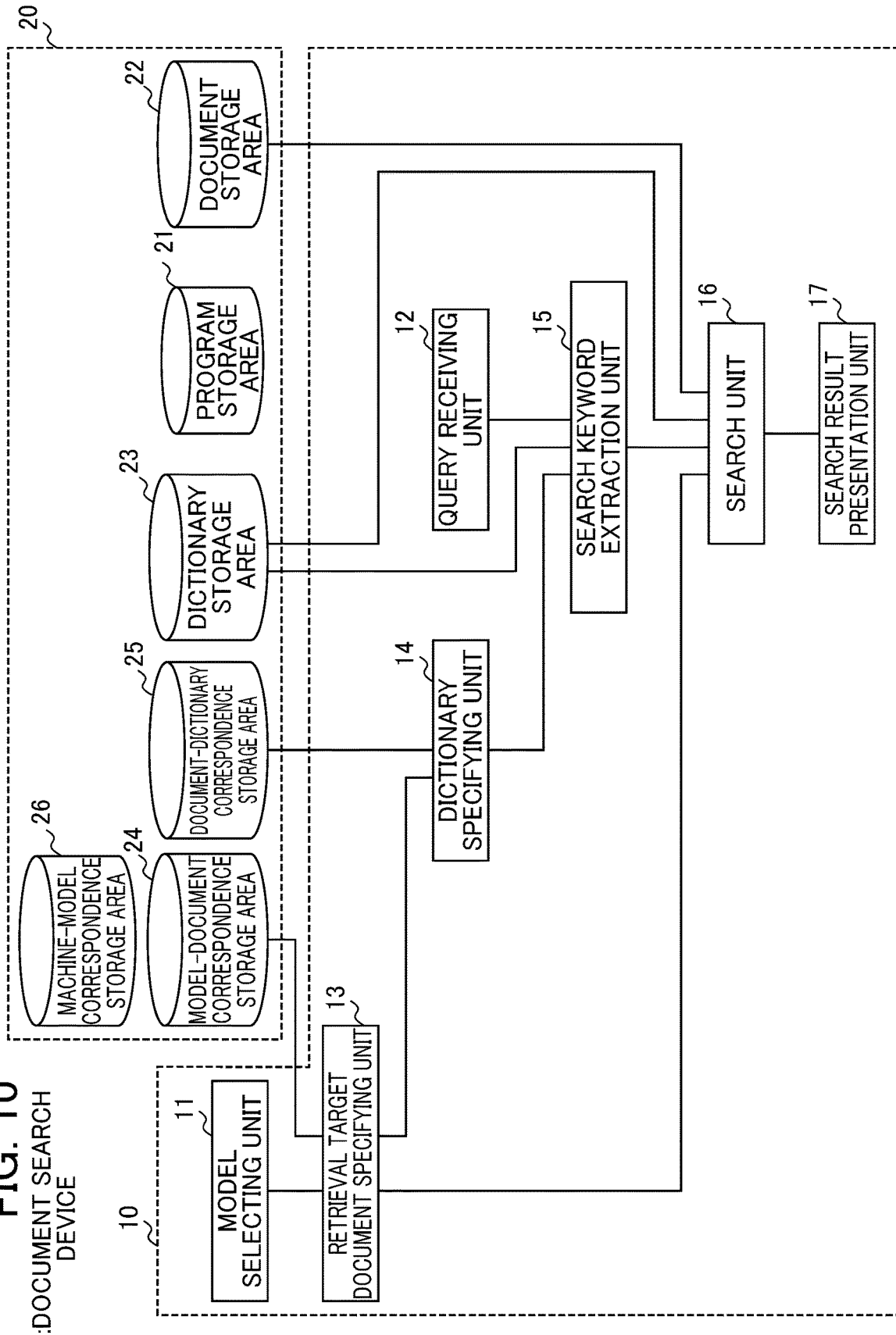
FIG. 10 is a block diagram illustrating a functional configuration when a document retrieval apparatus according to an embodiment includes a machine-model correspondence storage unit.
Figures 11, 12:
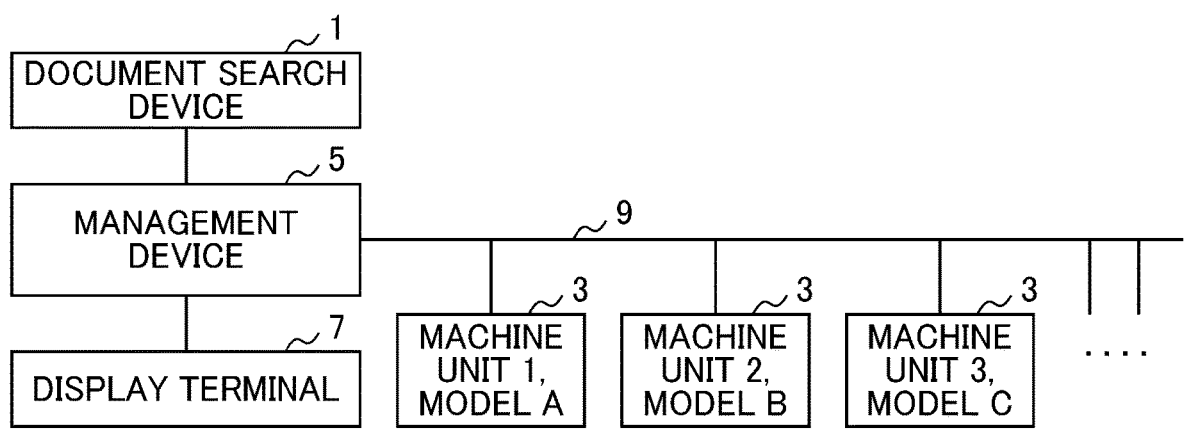
FIG. 11 is a diagram illustrating an example of a table illustrating a correspondence between a model name and identification information for uniquely identifying machines when one or more machines are communicably connected to a document retrieval apparatus 1.
FIG. 12 is a diagram illustrating a configuration in which a document retrieval apparatus according to an embodiment is network-connected to one or more machines and a network via a management device.

In the second embodiment, the document retrieval apparatus 1 may include a machine-model correspondence storage area 26 in the storage unit 20 as a machine-model correspondence storage unit. FIG. 10 is a functional block diagram of the document retrieval apparatus 1 when the storage unit 20 includes the machine-model correspondence storage area 26 as a machine-model correspondence storage unit. When one or more machines are communicably connected to the document retrieval apparatus 1 by a network or an interface connection, for example, a correspondence between identification information (for example, a machine ID, a machine name, or a machine number) for uniquely identifying the machine and a model name may be stored in the machine-model correspondence storage area 26. In this case, information indicating a model in the model-document correspondence storage area 24 and information indicating a model in the machine-model correspondence storage area 26 preferably have the same value. For example, when a model name is stored in the model-document correspondence storage area 24 as information indicating a model, the same model name as that stored in the model-document correspondence storage area 24 is preferably stored as information indicating the model in the machine-model correspondence storage area 26. FIG. 11 illustrates a table illustrating a correspondence between identification information for uniquely identifying a machine and a model name when one or more machines are communicably connected to the document retrieval apparatus 1 by a network or an interface connection, for example. Referring to FIG. 11, Machine unit 1, Machine unit 2, Machine unit 3, and the like are communicably connected to the document retrieval apparatus 1, and the model names of Machine unit 1, Machine unit 2, and Machine unit 3 are Model A, Model B, and Model C, respectively.

In the second embodiment, the document retrieval apparatus 1 is connected to the machine 3 and can receive a query (input by a user) from the machine 3 via a receiving unit (not illustrated). In this case, the document retrieval apparatus 1 can acquire the identification information of the machine. By doing so, the document retrieval apparatus 1 (the model selecting unit 11) can select (acquire) a search target model automatically by referring to a machine-model correspondence stored in the machine-model correspondence storage area 26. After that, the model selecting unit 11 can deliver the selected (acquired) model information to the search target document specifying unit 13. In this way, in the second embodiment, when the document retrieval apparatus 1 includes the machine-model correspondence storage area 26 in the storage unit 20, the user can omit an operation of selecting a model.

Specifically, it is assumed that a query from Machine unit 1, for example, is generally a query related to Model A (a model of Machine unit 1). Therefore, when a query is transmitted from Machine unit 1, information of Model A can be added as the model information. By doing so, in the configuration of FIG. 9, a query and model information can be transmitted to the document retrieval apparatus 1. Since the document retrieval apparatus 1 includes a receiving unit (not illustrated) that receives a query and the model information, the user can omit an operation of selecting a model when inputting a query from an interface screen (a retrieval screen) of a machine.

Furthermore, in the second embodiment, processing may be performed in the following manner. For example, when an alarm xxxx is generated in Machine unit 1, a query "alarm xxxx has occurred" and model information of Model A may be transmitted automatically to the document retrieval apparatus 1. By doing so, when an alarm is generated, description related to the alarm can be retrieved from a document applied to the model without the user inputting a query related to the alarm xxxx. In this way, in the second embodiment, by setting a combination of a machine state (for example, a state in which an alarm has been generated) and a query related to the alarm in advance and storing the combination in the machine 3, when an alarm is generated in the machine, it is possible to reduce the burden of the user inputting a query or the like related to the alarm. The machine state is not limited to a state in which an alarm has been generated. For example, by the user setting a query in advance related to a machine state in which no alarm has been generated, when the machine 2 is in that state, a description related to the state can be retrieved automatically from a document applied to the model without the user inputting a query related to the state.

Processing after the model selecting unit 11 delivers the model information to the search target document specifying unit 13 is the same as that of the first embodiment, and the description thereof will be omitted. Hereinabove, the document retrieval apparatus 1 and the machine 3 according to the second embodiment illustrated as the present embodiment have been described.

Third Embodiment

The document retrieval apparatus 1 according to the second embodiment is network-connected to one or more machines 3 via the network 9. In contrast, the third embodiment is different in that, when the document retrieval apparatus 1 and the machine 3 are network-connected via a network, they are communicably connected via a management device 5. FIG. 12 is a diagram illustrating a configuration in which the document retrieval apparatus 1 and one or more machines 3 are network-connected via the management device 5. In this case, functions similar to the functions described in the second embodiment can be realized. Specifically, the management device 5 may include the function of a router, for example, so that the document retrieval apparatus 1 and the machine 3 are network-connected similarly to the second embodiment. In this case, an operation similar to that of the second embodiment can be performed.

On the other hand, in the third embodiment, for example, when a user remote-controls a machine using the management device 5, a display terminal 7, for example, may be provided in the management device 5 so that the query receiving unit 12 of the document retrieval apparatus 1 provides an interface screen for inputting queries to the display terminal 7 via the management device 5. Similarly, the retrieval result presenting unit 17 of the document retrieval apparatus 1 may provide an interface screen for presenting search results to the display terminal 7 via the management device 5. Specifically, for example, a client-server system in which the management device 5 (or the display terminal 7) is configured as a client and the document retrieval apparatus 1 is configured as a server or a WEB system in which the management device 5 (or the display terminal 7) is a WEB terminal and the document retrieval apparatus 1 is a WEB server may be employed. By doing so, the query receiving unit 12 of the document retrieval apparatus 1 can provide an interface screen for inputting queries to the display terminal 7 via the management device 5. Similarly, the retrieval result presenting unit 17 of the document retrieval apparatus 1 can provide an interface screen for presenting search results to the display terminal 7 via the management device 5.

Figure 13:
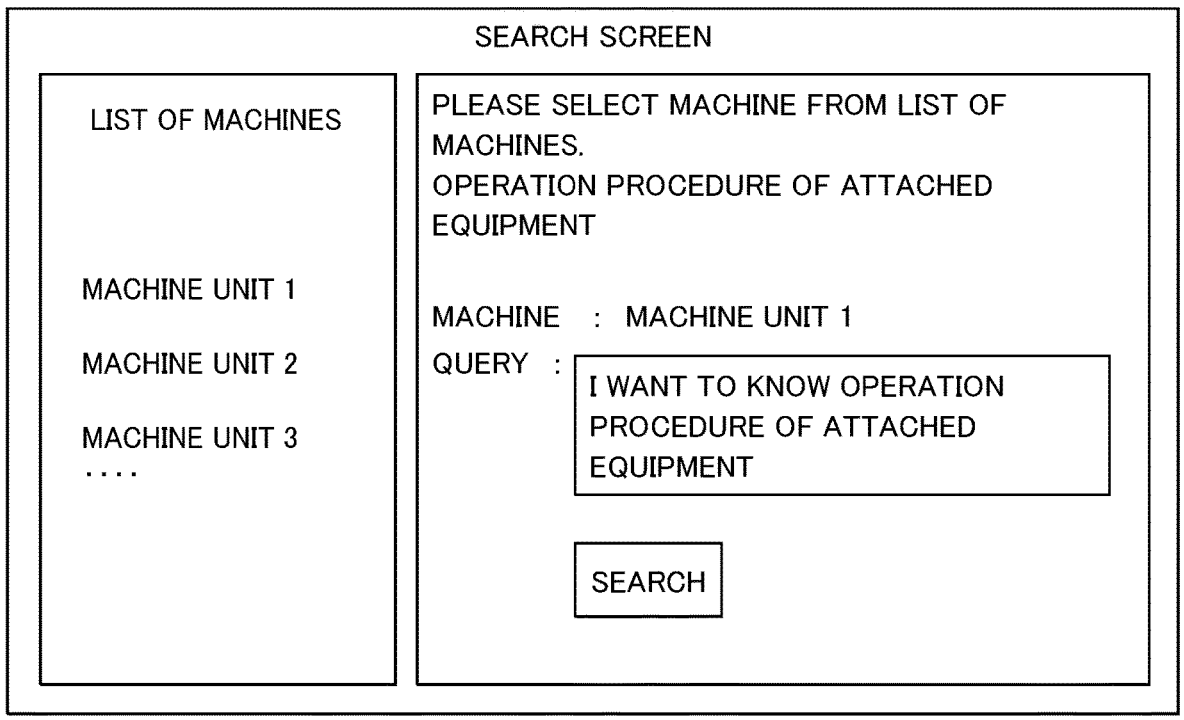
FIG. 13 is a diagram illustrating an example of a user interface related to a retrieval screen according to an embodiment.

Furthermore, the management device 5 may acquire all pieces of infotainment device of the network-connected machines via a network connection. By doing so, the management device 5 may display a list of pieces of machine identification information (for example, Machine unit 1, Machine unit 2 or Machine unit 3) on a display terminal instead of displaying a list of models, for example, to allow a user to select identification information of a machine. FIG. 13 illustrates an example of a user interface related to a retrieval screen for selecting identification information of a machine, output by the management device 5. As illustrated in FIG. 13, the management device 5 can allow a user to select identification information of a machine by displaying a list of pieces of machine identification information (for example, Machine unit 1, Machine unit 2, or Machine unit 3). When identification information of a machine is selected by a user, the management, device 5 may select (acquire) a search target model automatically by referring to the machine-model correspondence stored in the machine-model correspondence storage area 26. The management device 5 can transmit model information to the document retrieval apparatus 1. In this case, the machine-model correspondence may be stored in a storage unit (not illustrated) of the management device 5. The processing after the model selecting unit 11 delivers the model information to the search target document specifying unit 13 is the same as that of the first embodiment, and the description thereof will be omitted. Hereinabove, the document retrieval apparatus 1, the machine 3, the management device 5, and the display terminal 7 according to the third embodiment illustrated as the present embodiment have been described.

A retrieving method by the document retrieval apparatus 1 may be realized by software. When the method is realized by software, programs that form the software are installed in a computer (the document retrieval apparatus 1). Moreover, these programs may be recorded on a removable medium and distributed to users and may be distributed by being downloaded to a computer of a user via a network. In the case of the second embodiment, as described above, a client-side program may be installed in the machine 3. Similarly, in the case of the third embodiment, as described above, a client-side program may be installed in the management device 5 (or the display terminal 7).

<Effects of Present Embodiment>

Embodiments of the present disclosure are listed below. (1) According to the present embodiment, a document retrieval apparatus 1 includes: a document storage area 22 that stores documents applied to a model; a dictionary storage area 23 that stores dictionaries; a model-document correspondence storage unit 24 that stores a correspondence between a model and documents applied to the model; a document-dictionary correspondence storage unit 25 that stores a correspondence between the document and dictionaries applied to the document; and a control unit 10, wherein the control unit 10 includes: a model selecting unit 11 that selects a model; a search target document specifying unit 13 that specifies documents applied to the model selected by the model selecting unit 11 as search target documents by referring to the model-document correspondence storage unit 24; a dictionary specifying unit 14 that specifies dictionaries applied to the search target document specified by the search target document specifying unit 13 by referring to the document-dictionary correspondence storage unit 25; a query receiving unit 12 that inputs a query; a search keyword extraction unit 15 that extracts a search keyword group by applying the dictionary specified by the dictionary specifying unit 14 to the query input from the query receiving unit 12; a retrieving unit 16 that retrieves the search target document specified by the search target document specifying unit 14 using the search keyword group extracted by the search keyword extraction unit 15; and a retrieval result presenting unit 17 that displays search results retrieved by the retrieving unit 16. Due to this, it is possible to efficiently present a target document desired by a user without the user being conscious of whether a term unique to a model such as a machine tool, an industrial machine, and the like, for example, will be used as a search keyword when the user makes a query in a natural language to retrieve various documents related to the model (2) The document retrieval apparatus 1 according to (1) may be communicably connected to a plurality of machines 3. Due to this, for example, a user can input a query from the machine 3.

(3) The document retrieval apparatus 1 according to (1) may be communicably connected to the plurality of machines 3 via a management, device 5. Due to this, the same effect as in (2) is obtained.

(4) The document retrieval apparatus 1 according to (2) or (3) may further include a machine-model correspondence storage unit 26 that stores a correspondence between a machine 3 communicably connected to the document retrieval apparatus 1 and a model of the machine 3, wherein the model selecting unit 11 may select a model of a machine 3 communicably connected to the document retrieval apparatus 1 by referring to the machine-model correspondence storage unit 26. Due to this, a user can omit a model selecting process when making a query from the machine 3.

(5) In the document retrieval apparatus 1 according to (3), the management device 5 may include a machine-model correspondence storage unit 26 that stores a correspondence between a machine 3 connected to the management device 5 and a model of the machine 3, and the model selecting unit 11 may select a model of a machine 3 connected to the management device 5 by referring to the machine-model correspondence storage unit 26 included in the management device. Due to this, a user can omit a model selecting process by selecting a machine when making a query from the management device 5.

(6) The document retrieval apparatus 1 according to (2) or (3) may further include: a receiving unit that receives a query transmitted from the machine 3 and model information of the machine 3, wherein the model selecting unit 11 may select the model on the basis of model information of the machine 3 received by the receiving unit, and the query receiving unit 12 may input the query received by the receiving unit. Due to this, a user can omit a model selecting process when making a query from the machine 3.

(7) The document retrieval apparatus 1 according to (3) may further include: a receiving unit that receives a query transmitted from the management device 5 and model information of the machine 3, wherein the model selecting unit 11 may select the model on the basis of model information of the machine 3 received by the receiving unit, and the query receiving unit 12 may input the query received by the receiving unit. Due to this, the management device 5 can display a list of pieces of machine identification information (for example, Machine unit 1, Machine unit 2, or Machine unit 3) instead of a list of models and allow a user to select identification information of a machine.

(8) According to the present embodiment, a document retrieving method causes a computer to execute processing, the computer including: a document storage area 22 that stores documents applied to a model; a dictionary storage area 23 that stores dictionaries; a model-document correspondence storage unit 24 that stores a correspondence between a model and documents applied to the model; and a document-dictionary correspondence storage unit 25 that stores a correspondence between the document and dictionaries applied to the document, the processing including: a model selecting step of selecting a model; a search target document specifying step of specifying documents applied to the model selected in the model selecting step as search target documents by referring to the model-document correspondence storage unit 24; a dictionary specifying step of specifying dictionaries applied to the search target document specified in the search target document specifying step by referring to the document-dictionary correspondence storage unit 25; a query input step of inputting a query; a search keyword extraction step of extracting a search keyword group by applying the dictionary specified in the dictionary specifying step to the query input in the query input step; a retrieving step of retrieving the search target document specified in the search target document specifying step using the search keyword group extracted in the search keyword extraction step; and a search result presentation step of presenting search results retrieved in the retrieving step. Due to this, it is possible to provide the same effect as in (1).

While embodiments of the present invention have been described, the present invention is not limited to the above-described embodiments. The effects described in the embodiments of the present invention are only exemplary ones of most preferable effects produced by the present invention, and the effects of the present invention are therefore not limited to those described in the embodiments of the present invention.

[Modification 1]

In the above-described embodiments, the document retrieval apparatus 1 is exemplified as a device including the functional units (the model selecting unit 11, the query receiving unit 12, the search target document specifying unit 13, the dictionary specifying unit 14, the search keyword extraction unit 15, the retrieving unit 16, and the retrieval result presenting unit 17) and the storage areas (the document storage area 22, the dictionary storage area 23, the model-document correspondence storage area 24, the document-dictionary correspondence storage area 25, and the machine-model correspondence storage area 26), there is no limitation thereto. For example, the document retrieval apparatus 1 may be configured as a distributed processing system in which an arbitrary storage area among the storage areas is physically independent and is configured as a file server (a file device), for example, so as to be able to communicate with the respective functional units via a network or a physical interface. For example, the document storage area 22 and the dictionary storage area 23 may be configured as independent file servers (file devices). The distributed processing system is a known technique, and an arbitrary storage area may be configured as a file server.

The document retrieval apparatus 1 may be configured as a distributed processing system in which an arbitrary functional unit among the functional units (the model selecting unit 11, the query receiving unit 12, the search target document specifying unit 13, the dictionary specifying unit 14, the search keyword extraction unit 15, the retrieving unit 16, and the retrieval result presenting unit 17) is physically independent and is configured as a server, a PC, or the like, for example, so as to be able to communicate via a network or a physical interface.

For example, a character input device such as a personal computer or a portable terminal which uses a keyboard, a touch panel, or the like may be used as the query receiving unit 12. Moreover, a voice recognition function of a personal computer or a portable terminal may be used as the query receiving unit 12 to convert the voice of a user into character codes. Furthermore, a handwritten character recognition function of a personal computer or a portable terminal may be used as the query receiving unit 12 to convert characters hand-written by a user into character codes. In this case, the personal computer or the portable terminal serving as the query receiving unit 12 may be communicably connected to the other functional units of the document retrieval apparatus 1 via a network or a physical interface. In this case, the same personal computer or the same portable terminal may be used as the retrieval result presenting unit 17. Specifically, the personal computer or the portable terminal as the retrieval result presenting unit 17 may output the search results created by the other functional units (the retrieving unit 16 or the like) of the document retrieval apparatus 1 via a screen of the personal computer or the portable terminal.

The search target document specifying unit 13, the dictionary specifying unit 14, the search keyword extraction unit 15, the retrieving unit 16, and the retrieval result presenting unit 17 may be provided on independent physical servers, respectively. For example, the retrieving unit 16 may be communicably connected to the search target document specifying unit 13, the dictionary specifying unit 14, the search keyword extraction unit 15, and the retrieval result presenting unit 17 via a network or a physical interface. Moreover, the server device and the file server (file device) described above may be a virtual server on cloud, for example. In this case, the functional units may be configured as functions on cloud. Such decentralization including cloud is a known technique to those skilled in the art and is a matter of design choice as necessary. That is, an embodiment of the functional units and the storage units included in the document retrieval apparatus 1 may be configured as a distributed processing system in which the units are distributed and executed by one computer or a number of computers disposed at one location or distributed at several locations and connected mutually a communication network.

[Modification 2]

A document may be made up of an entire piece of document. Moreover, a document may be made up of a piece of document divided appropriately. When a document is made up of a piece of document divided appropriately, the retrieving unit 16 output a corresponding part of the divided pieces of document as a retrieval result. Similarly, the retrieval result presenting unit 17 may present a corresponding part of the divided pieces of documents as a retrieval result.

EXPLANATION OF REFERENCE NUMERALS

1: Document retrieval apparatus
10: Control unit
11: Model selecting unit
12: Query receiving unit
13: Search target document specifying unit
14: Dictionary specifying unit
15: Search keyword extraction unit
16: Retrieving unit
17: Retrieval result presenting unit
20: Storage unit
21: Program storage area
22: Document storage area
23: Dictionary storage area
24: Model-document correspondence storage area.
25: Document-dictionary correspondence storage area
26: Machine-model correspondence storage area.
3: Machine
5: Management device
7: Display terminal
9: Network

What is claimed is:

1. A document retrieval apparatus comprising:
a document storage area that stores documents applied to a model;
a dictionary storage area that stores dictionaries, the dictionaries including at least one of a synonym dictionary or a similar word dictionary;
a model-document correspondence storage unit that stores a correspondence between a model and documents applied to the model;
a document-dictionary correspondence storage unit that stores a correspondence between the document and at least one dictionary applied to the document; and
a control unit, wherein
the control unit includes:
a model selecting unit that selects a model;
a search target document specifying unit that specifies documents applied to the model selected by the model selecting unit as search target documents by referring to the model-document correspondence storage unit;
a dictionary specifying unit that specifies at least one dictionary applied to the search target document specified by the search target document specifying unit by referring to the document-dictionary correspondence storage unit;
a query receiving unit that inputs a query;
a search keyword extraction unit that extracts a search keyword group by applying the dictionary specified by the dictionary specifying unit to the query input from the query receiving unit;
a retrieving unit that retrieves the search target document specified by the search target document specifying unit using the search keyword group extracted by the search keyword extraction unit; and
a retrieval result presenting unit that displays search results retrieved by the retrieving unit.

2. The document retrieval apparatus according to claim 1, wherein the document retrieval apparatus is communicably connected to a plurality of machines.

3. The document retrieval apparatus according to claim 2, wherein the document retrieval apparatus is communicably connected to the plurality of machines via a management device.

4. The document retrieval apparatus according to claim 2, further comprising:
a machine-model correspondence storage unit that stores a correspondence between a machine communicably connected to the document retrieval apparatus and a model of the machine, wherein
the model selecting unit selects a model of a machine communicably connected to the document retrieval apparatus by referring to the machine-model correspondence storage unit.

5. The document retrieval apparatus according to claim 3, wherein the management device includes a machine-model correspondence storage unit that stores a correspondence between a machine connected to the management device and a model of the machine, and the model selecting unit selects a model of a machine connected to the management device by referring to the machine-model correspondence storage unit included in the management device.

6. The document retrieval apparatus according to claim 2, further comprising:
a receiving unit that receives a query transmitted from the machine and model information of the machine, wherein
the model selecting unit selects the model on the basis of the model information of the machine received by the receiving unit, and
the query receiving unit inputs the query received by the receiving unit.

7. The document retrieval apparatus according to claim 3, further comprising:
a receiving unit that receives a query transmitted from the management device and model information of the machine, wherein
the model selecting unit selects the model on the basis of the model information of the machine received by the receiving unit, and
the query receiving unit inputs the query received by the receiving unit.

8. A document retrieving method for causing a computer to execute processing, the computer including:
a document storage area that stores documents applied to a model;
a dictionary storage area that stores dictionaries, the dictionaries including at least one of a synonym dictionary or a similar word dictionary;
a model-document correspondence storage unit that stores a correspondence between a model and documents applied to the model; and
a document-dictionary correspondence storage unit that stores a correspondence between the document and at least one dictionary applied to the document, the processing comprising:
a model selecting step of selecting a model;
a search target document specifying step of specifying documents applied to the model selected in the model selecting step as search target documents by referring to the model-document correspondence storage unit;
a dictionary specifying step of specifying at least one dictionary applied to the search target document specified in the search target document specifying step by referring to the document-dictionary correspondence storage unit;
a query input step of inputting a query;
a search keyword extraction step of extracting a search keyword group by applying the dictionary specified in the dictionary specifying step to the query input in the query input step;
a retrieving step of retrieving the search target document specified in the search target document specifying step using the search keyword group extracted in the search keyword extraction step; and
a search result presentation step of presenting search results retrieved in the retrieving step.

* * * * *